United States Patent
Stanfill

(10) Patent No.: US 9,678,834 B2
(45) Date of Patent: Jun. 13, 2017

(54) RECOVERY AND FAULT-TOLERANCE UNDER COMPUTATIONAL INDETERMINISM

(71) Applicant: Ab Initio Technology LLC, Lexington, MA (US)

(72) Inventor: Craig W. Stanfill, Lincoln, MA (US)

(73) Assignee: Ab Initio Technology, LLC, Lexington, MA (US)

( * ) Notice: Subject to any disclaimer, the term of this patent is extended or adjusted under 35 U.S.C. 154(b) by 0 days.

(21) Appl. No.: 14/886,363

(22) Filed: Oct. 19, 2015

(65) Prior Publication Data

US 2016/0110271 A1    Apr. 21, 2016

Related U.S. Application Data

(60) Provisional application No. 62/065,941, filed on Oct. 20, 2014.

(51) Int. Cl.
*G06F 11/00* (2006.01)
*G06F 11/14* (2006.01)
*G06F 9/52* (2006.01)

(52) U.S. Cl.
CPC .......... *G06F 11/1438* (2013.01); *G06F 9/526* (2013.01); *G06F 11/1479* (2013.01)

(58) Field of Classification Search
CPC ......... G06F 11/1438; G06F 11/1446–11/1471; G06F 9/526
See application file for complete search history.

(56) References Cited

U.S. PATENT DOCUMENTS 6,584,581 B1    6/2003 Bay et al.
7,305,582 B1    12/2007 Moser et al.
(Continued)

FOREIGN PATENT DOCUMENTS

EP           05333446       3/1993
WO           WO 01/42920    6/2001

OTHER PUBLICATIONS

*International Search Report and Written Opinion*, International Application No. PCT/US2015/056159, mailed Mar. 2, 2016 (11 pages).

(Continued)

*Primary Examiner* — Jason Bryan
(74) *Attorney, Agent, or Firm* — Occhiuti & Rohlicek LLP

(57) ABSTRACT

A method for promoting fault tolerance and recovery in a computing system including at least one processing node includes promoting availability and recovery of a first processing node, by, at the first processing node, generating first spawn using a spawner that has been assigned a first generation-indicator so that its spawn inherits the first generation indicator, beginning a checkpoint interval to generate nodal recovery information, suspending the spawner from generating spawn, assigning, to the spawner, a second generation-indicator that differs from the first one, resuming the spawner, so that it generates second spawn that inherits the second generation-indicator, controlling an extent to which the second spawn writes to memory, and after committing nodal recovery information acquired during the checkpoint to durable storage, releasing control over the extent to which the second spawn can write to memory.

58 Claims, 9 Drawing Sheets

(56) References Cited

U.S. PATENT DOCUMENTS

| | | | |
|---|---|---|---|
| 8,826,070 B1* | 9/2014 | Havemose | G06F 11/1461 714/13 |
| 2005/0034014 A1* | 2/2005 | Moser | G06F 9/485 714/17 |
| 2007/0277056 A1* | 11/2007 | Varadarajan | G06F 11/1438 714/15 |
| 2012/0222034 A1 | 8/2012 | Ishikawa et al. | |
| 2014/0282605 A1* | 9/2014 | Jacobson | G06F 9/461 718/107 |

OTHER PUBLICATIONS

Akidau, Tyler, Alex Balikov, Kaya Bekiroglu, Slava Chernyak, Josh Haberman, Reuven Lax, Sam McVeety, Daniel Mills, Paul Nordstrom, and Sam Whittle. "MillWheel: fault-tolerant stream processing at internet scale." *Proceedings of the VLDB Endowment* 6, No. 11 (2013): 1033-1044.

* cited by examiner

RECOVERY AND FAULT-TOLERANCE UNDER COMPUTATIONAL INDETERMINISM

CROSS-REFERENCE TO RELATED APPLICATIONS

This application claims the benefit of the Oct. 20, 2014 priority date of the U.S. application Ser. No. 62/065,941, the contents of which are herein incorporated by reference.

BACKGROUND

This description relates to recovery and fault-tolerance in the presence of computational indeterminism.

Computational systems occasionally fail for a variety of reasons. When such systems fail, data can be lost. It is desirable to take measures to prevent, or at least minimize, such data loss.

Examples of such measures include ACID (Atomic, Consistent, Isolated until committed, Durable when committed) transactions in databases. These known measures are extremely robust. They can be made to meet very high standards of correctness, while also being made fault tolerant.

However, all of this robustness comes at a cost. Known methods for guarding against failure have high latency and sometimes cause extended periods during which the apparatus is unavailable. Thus, they are less than optimal for high-volumes of transactions.

In addition, some known methods require deterministic computation. In deterministic computation, the order in which tasks are performed is fixed, and the result of a computation remains the same each time it is carried out. It is not clear how these known methods can be adapted to efficiently handle non-deterministic computational environments.

Additional complexity arises when a computing apparatus includes multiple processing nodes that cooperate with each other. In such an apparatus, it is possible for one node of the apparatus to fail, and others to keep working. When that failed node recovers, this is no guarantee that it has restored itself to a state that the other nodes expect it to be in.

SUMMARY

In one aspect, the invention features a method for promoting fault tolerance and recovery in a computing system that includes at least one processing node. Such a method includes promoting availability and recovery of a first processing node, wherein promoting availability and recovery includes, at a first processing node, executing a spawner at the node, wherein the spawner, in the course of execution, generates a first spawn, wherein executing the spawner includes assigning, to the spawner, a first generation indicator, wherein the first spawn inherits the first generation indicator; beginning a checkpoint interval, at the end of which nodal recovery information, which is usable for recovery of the node, is committed to durable storage, wherein beginning the checkpoint interval includes suspending the spawner from generating spawn, assigning, to the spawner, a second generation indicator that differs from the first generation indicator, resuming the spawner, thereby enabling the spawner to generate a second spawn, wherein the second spawn inherits the second generation indicator, and controlling an extent to which the second spawn writes to memory; and after committing the nodal recovery information, releasing control over the extent to which the second spawn can write to memory.

In some practices, controlling an extent to which the second spawn writes to memory includes preventing the second spawn from consummating a write to the memory. Among these are practices that further include permitting the second spawn to queue the write to memory for eventual consummation thereof after the recovery information has been committed.

In other practices, controlling an extent to which the second spawn writes to memory includes determining that the write operation is a commutable operation, and allowing consummation of the commutable operation. Among these practices are those in which determining that the write operation is a commutable operation includes determining that the write operation includes incrementing a variable, and those in which determining that the write operation is a commutable operation includes determining that the write operation includes inserting a record at a specified location.

Also among the practices of the invention are those that further include, after suspending the spawner, setting a deadline, thereby providing time for any spawn having the first task generation-indicator to execute to completion, and avoiding overhead associated with having to save states of the spawn having the first generation-indicator. Among these practices are those that include suspending the first spawn if the first spawn is still executing as of the deadline, and those that include enabling the first spawn to avoid suspension as a result of having failed to complete execution by the deadline, for example by changing the first task generation-indicator to the second task generation-indicator in the first spawn if the first spawn is still executing as of the deadline.

In those cases in which the first node has a nodal-generation indicator, additional practices of the invention include causing a spawn to become a migrant that migrates to a second node, wherein the second node has a nodal-generation indicator. Among these practices are those in which the nodal-generation counter of the second node indicates that the second node is in a younger generation than the first node, in which case the method further includes youthening the migrant, either by immigration-side youthening of the migrant, or by emigration-side youthening of the migrant.

In some cases, the first node is a node in a multi-node system in which each node has a nodal generation-count, and the multi-node system includes at least a second node. In these cases, there are practices of the invention in which, upon recovery following a failure of the second node, the first node rolls back to a state that corresponds to a nodal-generation count of the second node.

In other cases, the first node is a node in a multi-node system in which each node has a nodal generation-count, and the multi-node system includes at least a second node. In these cases, some practices of the invention include, upon recovery following a failure of the first node, having the first node roll forward to a state that corresponds to a nodal-generation count of the second node by restoring committed work from a checkpoint and restoring uncommitted work from a journal.

In those cases in which the first node is a node in a multi-node system in which each node has a nodal generation-count, practices of the invention include those in which the first node carries out certain acts. These include receiving, from a master node, a message indicating that a checkpoint is to be carried out, in response, youthening a nodal generation count of the first node, suspending spawners from generating spawn, saving spawner recovery information for recovering spawner states, resuming the spawners, determining that no further older-generation immigrants are expected at the first node, and in response to the determination, committing, to the durable storage, the nodal recovery information. Among these practices are those that also include setting a deadline, and, upon lapse of the deadline, suspending all older-generation spawn that are still executing while younger-generation spawn continue to execute.

In some cases, the first node is a node in a multi-node system. In such cases, alternative practices of the invention include saving a replica copy of working memory of the first node at the second node, upon failure of the first node, temporarily using the replica copy for processing that would otherwise have been carried out by the first node, and, upon recovery of the first node, communicating, to the first node, information required to update memory in the first node so that subsequent computation can be carried out by the first node.

In another aspect, the invention features software that has been stored in a non-transitory form on a computer-readable medium and that, when executed, promotes fault tolerance and recovery in a computing system that includes at least one processing node. The software has instructions for causing a computing system to: promote availability and recovery of a first processing node, wherein promoting availability and recovery includes, at a first processing node, executing a spawner at the node, wherein the spawner, in the course of execution, generates a first spawn, wherein executing the spawner includes assigning, to the spawner, a first generation indicator, wherein the first spawn inherits the first generation indicator; beginning a checkpoint interval, at the end of which nodal recovery information, which is usable for recovery of the node, is committed to durable storage, wherein beginning the checkpoint interval includes suspending the spawner from generating spawn, assigning, to the spawner, a second generation indicator that differs from the first generation indicator, resuming the spawner, thereby enabling the spawner to generate a second spawn, wherein the second spawn inherits the second generation indicator, and controlling an extent to which the second spawn writes to memory; and after committing the nodal recovery information, releasing control over the extent to which the second spawn can write to memory.

In yet another aspect, the invention features a data storage system including durable storage; and one or more processing nodes including least one processor configured to promote availability and recovery of a first processing node, wherein promoting availability and recovery includes, at a first processing node, executing a spawner at the node, wherein the spawner, in the course of execution, generates a first spawn, wherein executing the spawner includes assigning, to the spawner, a first generation indicator, wherein the first spawn inherits the first generation indicator; beginning a checkpoint interval, at the end of which nodal recovery information, which is usable for recovery of the node, is committed to durable storage, wherein beginning the checkpoint interval includes suspending the spawner from generating spawn, assigning, to the spawner, a second generation indicator that differs from the first generation indicator, resuming the spawner, thereby enabling the spawner to generate a second spawn, wherein the second spawn inherits the second generation indicator, and controlling an extent to which the second spawn writes to memory; and after committing the nodal recovery information, releasing control over the extent to which the second spawn can write to memory.

Yet another aspect of the invention features an apparatus that includes means for durably storing data in durable storage; and means for promoting availability and recovery of a first processing node, wherein promoting availability and recovery includes, at a first processing node, executing a spawner at the node, wherein the spawner, in the course of execution, generates a first spawn, wherein executing the spawner includes assigning, to the spawner, a first generation indicator, wherein the first spawn inherits the first generation indicator; beginning a checkpoint interval, at the end of which nodal recovery information, which is usable for recovery of the node, is committed to durable storage, wherein beginning the checkpoint interval includes suspending the spawner from generating spawn, assigning, to the spawner, a second generation indicator that differs from the first generation indicator, resuming the spawner, thereby enabling the spawner to generate a second spawn, wherein the second spawn inherits the second generation indicator, and controlling an extent to which the second spawn writes to memory; and after committing the nodal recovery information, releasing control over the extent to which the second spawn can write to memory.

Aspects can have one or more of the following advantages.

The techniques for promoting fault tolerance and recovery described herein enable the computing system to remain highly available. By strategically relaxing certain ACID constraints, the computing system can still provide recoverability, but without the high overhead of more extreme measures. Thus, there are more computing resources available for useful work. Also, by controlling the extent to which spawn (e.g., operating system processes or threads) write to memory, useful work can still be accomplished during a checkpoint interval, while ensuring that integrity of the fault tolerance mechanisms is maintained. Thus, these techniques enhance the internal functioning of the computing system, both in the event of faults, and during normal fault-free operation.

DETAILED DESCRIPTION

Figure 1:
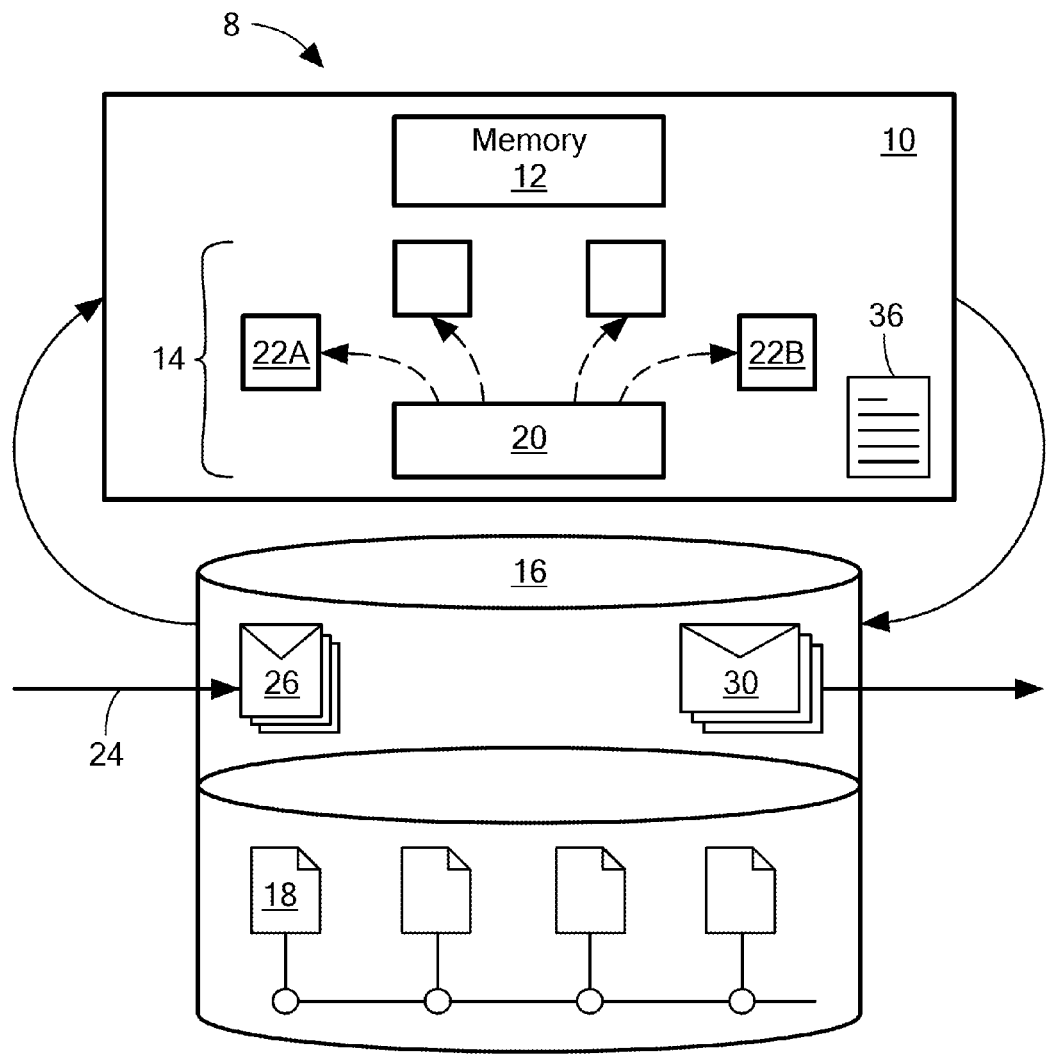
FIG. 1 shows a single-node computing apparatus for carrying our fault-tolerance and recovery in the presence of computational indeterminism.

FIG. 1 shows an example of a data processing system in which techniques for fault tolerance and recovery in the presence of computational indeterminism can be used. The data processing system includes a single-node computing apparatus 8 having a node 10 that includes a working-memory 12. Processes 14 running on that node 10 use this working-memory 12 to save their respective process states and to store intermediate results of their respective computations. In different embodiments, the processes 14 may be implemented as any of a variety of types of computing resources within an operating system running on the node 10. For example, the processes 14 may be implemented as operating system 'processes' that have their own address space, or as operating system 'threads' that have their own execution context (e.g., stage, registers, etc.), or as some other type of 'task' that includes a sequence of operations to be performed but does not necessarily have a particular operating system process or thread dedicated to it.

Because the working-memory 12 is often volatile, it is prudent to periodically save its state in checkpoint files 18 stored in durable storage 16. These checkpoint files 18 can be used to recover state information in case of an interruption in operation of the node 10.

Among the processes 14 running on the node are spawners 20. A "spawner" is a type of process that has, among its properties, the ability to generate one or more other processes. The processes that are generated by a spawner are referred to herein, both in the singular and in the plural, as "spawn." The act of generating such spawn is referred to by appropriate variants of the verb "to spawn." FIG. 1 shows a spawner 20 that has generated spawn 22A, 22B. A spawner 20 is generally a long-lived process, whereas the spawn 22A, 22B, although numerous, tend to be much shorter-lived. In some instances, a spawner is a process that lives longer than spawn generated by that spawner. The spawn 22A, 22B are also independent of and asynchronous relative to each other so that the extent to which a spawn 22A, 22B has completed its computation is unrelated to when the spawner 20 generated that spawn 22A, 22B in the first place. As a result, the order in which spawn 22A, 22B carry out computations is indeterminate. Since the order in which computations are carried out can often affect the results, this makes the computation as a whole indeterminate.

During the course of its operation, the computing apparatus 8 communicates with the outside world. For example, the computing apparatus 8 may receive one or more streams of incoming messages 24 and produce one or more streams of outgoing messages 28. As will be described in greater detail below, these messages 24, 28 are temporarily stored by the apparatus 8 within the durable storage 16. These messages 24, 28 may be temporarily stored for escrow within respective areas that are physically and/or logically separate. Incoming messages 24 can be stored in an incoming-message escrow area 26 in durable storage 16, and outgoing messages 28 can be stored in an outgoing-message escrow area 30 in durable storage 16.

Figure 2:
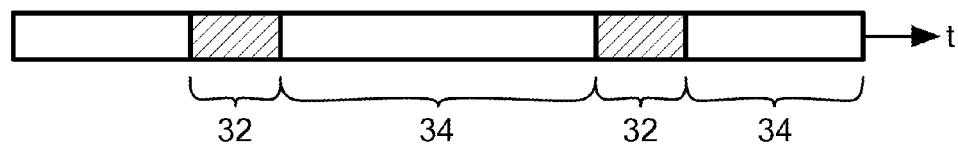
FIG. 2 shows checkpoint intervals and working intervals encountered during operation of the node of FIG. 1.

Referring to FIG. 2, the node's operation is marked by checkpoint intervals 32 and working intervals 34. During a working interval 34, the node performs useful work as processes advance towards completion. During the checkpoint interval 32, the node 10 suspends all processes, serializes them, and saves the result to durable storage 16. The node 10 then saves anything else that is in working-memory into the durable storage 16. At this point, the checkpoint is said to have been "committed" and the processes 14 are said to have been "checkpointed."

It is preferable that the checkpoint interval 32 be much shorter than the working interval 34. The apparatus and methods described herein are intended to increase the amount of processing that can be performed in the working intervals 34 by reducing the length of the checkpoint interval 32.

Once a checkpoint is committed, the node 10 allows processes 14 to resume and releases outgoing messages 28 that are in the outgoing-message escrow area 30.

The storing of outgoing messages 28 in an outgoing-message escrow area 30, rather than sending them immediately, is useful to guard against inconsistency that may result from a failure of the node 10. For example, it would be quite possible for a process 14 to send an outgoing message 28 announcing the result of some computation. If the node 10 were to fail after this message 28 has already been sent but before the computational result is committed to durable storage 16, the node 10 would re-start and re-execute the uncommitted computation. Upon completion, another message 28 would be sent announcing the result of this second computation. If the two results are different, which is not unlikely in the case of non-deterministic computations, one of the messages will be invalid.

As a concrete example, consider the case in which a process 14 awards a prize to a customer based on the result of a random number generator. Without the outgoing-message escrow area 30, the process 14 would send a message 28 to a first customer announcing that a prize was forthcoming. The node 10 would then crash and re-start. Since the state of the process 14 was never saved, there is no record of that customer having been awarded any prize, or of the process 14 having successfully completed execution. The node 10 may then re-execute the process 14, which would then generate a different random number, thus causing a second message 28 to be sent to another customer announcing that a prize was forthcoming. This would require either awarding two prizes where only one was intended, or managing at least one disappointed customer.

To recover after a failure, the node 10 retrieves, from durable storage 16, the state of all processes 14 and the state of working-memory 12. It then retransmits any outgoing messages 28 that are stored in the outgoing-message escrow area 30, retrieves incoming messages from incoming-message escrow area 16 for processing, and then resumes normal operation on live data.

The retransmission of all messages 28 in the outgoing-message escrow area 30 can result in recipients receiving duplicate messages. In one embodiment, the recipient is configured to ignore repeated messages 28. In another embodiment, upon recovery, the recipient and the recovered node 10 communicate to identify messages 28 that have been received. This permits the node 10 to avoid sending duplicate messages 28.

The procedure described above introduces results in a lengthy checkpoint interval 32, which may, in turn, result in either low throughput or an increased latency between the receipt of an incoming message and the production of a corresponding outgoing message. A variety of methods can be used to reduce this latency, and/or increase the throughput.

A first optimization method features the maintenance of a journal 36 in the background. Every time an item in the working-memory 12 is altered a corresponding entry will be written to the journal 36 such that the journal entry may be used to reproduce the alteration at recovery time. The journal 36 may be asynchronously transferred to durable storage 16. During the checkpoint interval 32 the node 10 will ensure that all journal entries have indeed been made durable. Recovery can then be achieved by using an older checkpoint file 18 containing a snapshot of working-memory 12 and applying the changes as set forth in the journal 36.

This optimization reduces the length of the checkpoint interval 32 but at the cost of increasing the time to recover. In particular, the longer it has been since the last full image of working-memory 12 was obtained, the greater the number of entries there will be in the journal 36. This will increase recovery time.

A second optimization method relies on the fact that the node 10 has only a few spawning processes 20, each of which generates (or "spawns") multitudes of short-lived processes, referred to herein in both the singular and plural as the "spawn 22A, 22B."

The lifetime of spawn 22A, 22B is random, but has an expected value that is much shorter than the expected value of the lifetime of a spawner 20. As such, it makes little sense to spend time serializing spawn 22A, 22B during a checkpoint. In fact, in some cases, the time required to serialize spawn 22A, 22B is an appreciable fraction the spawn's expected lifetime. It is therefore often advantageous to instead suspend the spawner 20, thus preventing generating of new spawn and to then allow the existing spawn 22A, 22B to terminate naturally.

Figure 3:
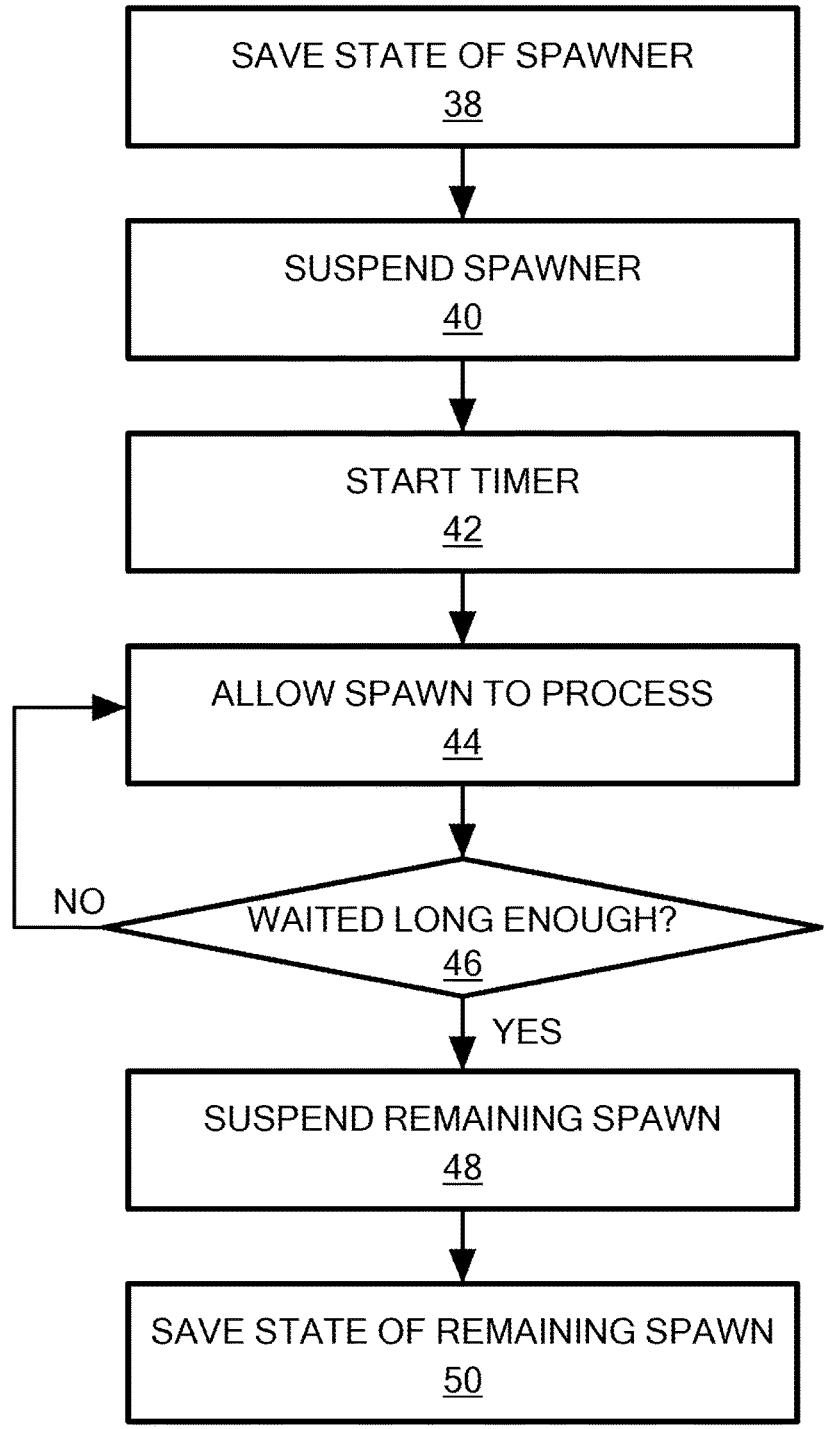
FIG. 3 shows a method in which spawn are allowed to run to completion during the checkpoint interval of FIG. 2.

To save time, the checkpoint-generating method, as shown in FIG. 3, includes suspending a spawner 20 (step 38) and serializing it (step 40). However, existing spawn 22A continue executing (step 42). Then, after a straggler's deadline, which is selected to define a sufficiently long idle-down interval be long enough to allow most spawn 22A to finish executing but not so long as to appreciably impact latency (step 46), spawn that are still executing, referred to as "straggling spawn," are suspended (step 48), and serialized (step 50).

The foregoing method thus reduces the length of the checkpoint interval 32 by reducing the number of processes 14 that need to be serialized. It does so by allowing processes 22 that are expected to terminate quickly to do so, thus eliminating the need to serialize those processes 22 as part of creating a valid checkpoint.

A third optimization procedure arises from the recognition that the evil to be avoided is actually a change to the working-memory 12 during the checkpoint interval 32. Therefore, if a process 14 does not actually have to write to working-memory 12, but instead only has to read working-memory 12, it makes no sense to suspend it.

To implement this third optimization procedure, the node 10 relies on a generation count associated with each process. Since the spawner 20 is a process, it has a generation count. Since the spawn 22A, 22B of a spawner is also a process, it too has a generation count. The generation counts of a spawn 22A and a spawner 20 that spawned that spawn 22A are related. In particular, the generation count of a spawn 22A, 22B is equal to the generation count of the spawner 20 that spawned it. The act of causing the generate count of a spawn 22A, 22B to be related to, or derivable from, the generation count of the spawner that spawned it is described by the appropriate form of the verb "to inherit." When a spawner 20 with a particular generation count generates spawn 22A, 22B, the spawn 22A, 22B is said to have inherited the spawner's generation count.

In operation, prior to the onset of a checkpoint interval 32, a spawner 20 will have generated older-generation spawn 22A. At the beginning of the checkpoint interval 32, the spawner 20 is "youthened."

The verb "to youthen" and its variants and cognates describes a particular computational operation that can be carried out on an integer. As used herein, the particular integer upon which the youthening operation operates is the generation count. describes an operation that can be carried out on a generation count.

In the particular example described herein, the act of youthening a spawner 20 means the act of incrementing its generation count. After having been youthened, the spawner 20 then continues to generate spawn during the checkpoint interval 32, only now, it generates younger-generation spawn 22B. The result of this is that two kinds of spawn 22 coexist within the node 10: older-generation spawn 22A, which the spawner 20 generated before having been youthened, and a younger-generation spawn 22B, which the spawned 20 generated after having been youthened.

Figure 4:
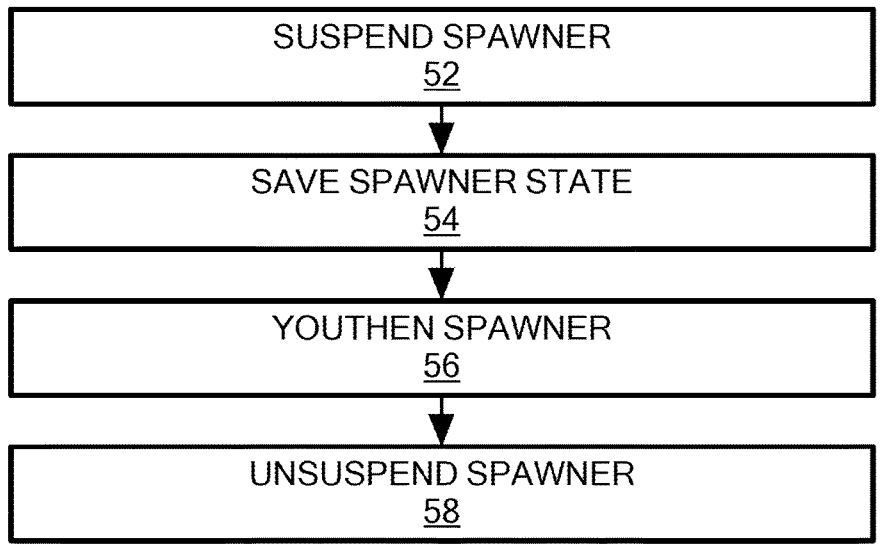
FIG. 4 shows a method in which a spawning process can continue to generate spawn during the checkpoint interval of FIG. 2.

Referring to FIG. 4, at the beginning of a checkpoint interval, the spawner 20 is suspended (step 52), such that it does not generate any new spawn while being suspended, and its process state saved (step 54). The spawner 20 then has its generation count incremented (step 56), after which the spawner 20 resumes (i.e., is un-suspended). After resuming, the spawner 20 is once again able to generate spawn 22, though this time, all its spawn 22B will be in the younger-generation spawn.

Any younger-generation spawn 22B that attempt to write to the working-memory 12, are blocked until the checkpoint interval 32 is completed. Thus, younger-generation spawn 22 cannot run to completion. They can only run until it is time to actually write to working-memory 12 for the first time. Nevertheless, younger-generation spawn 22 can at least run partway to completion. This allows some processing to occur even during a checkpoint interval 32.

In general, during the checkpoint interval 32, all processes 14 in memory 12 will be serialized. However, in the optimization method of FIG. 4, it is desirable to serialize only older-generation spawn 22A.

The generation count enables the node 10 to identify which spawn is younger-generation spawn 22B and to therefore avoid saving their state.

Unfortunately, having to wait for older-generation spawn 22A to complete processing tended to increase latency because younger-generation spawn 22B could not proceed full bore until either all older-generation spawn 22A were done or until the straggler deadline triggered suspension of stragglers from the older-generation spawn 22A.

In a variant of the second optimization method, instead of blocking younger-generation spawn 22B that attempt to modify working-memory 12, and thus losing the opportunity to continue doing useful work, the node 10 can tag each data item in working-memory 12 with a generation number. If a younger-generation spawn 22B modifies a memory location, rather than blocking until after the checkpoint, the node 10 will youthen the memory location by updating its generation number. Then, if an old-generation spawn 22A attempts to read or write such a youthened memory location the older-generation spawn 22A will spontaneously youthen itself by suspending itself, writing its state to the checkpoint, updating its generation number, and resuming execution in a youthened state. The node 10 also tags the entries written to the journal with the generation number so that it can distinguish journal entries corresponding to the older generation of spawn from journal entries corresponding to the younger generation of spawn.

A fourth optimization method relies on the idea of allowing younger-generation spawn 22B to continue processing even past the first attempted write to working-memory 12. This method relies on the fact that sometimes, the order in which computational results are written into working-memory 12 does not matter. If this is the case, writes to working-memory 12 can simply be queued until later. This method allows a younger-generation spawn 22B to keep working during a checkpoint interval 32 even after the first time attempts to write to working-memory 12.

In general, whenever one carries out a sequence of operations, a question that arises is whether or not the order of operations in the sequence makes a difference in the result of the sequence. An operation within this sequence is said to be "commutable" if the location of that operation within the sequence does not affect the result. Otherwise, the operation is "non-commutable." Examples of commutable operations are instructions to increment or decrement a value, instructions to insert a record into a list at some defined location, and in general, any operation that does not require reading a value to be carried out. The fourth optimization method exploits these commutable operations.

Figure 5:
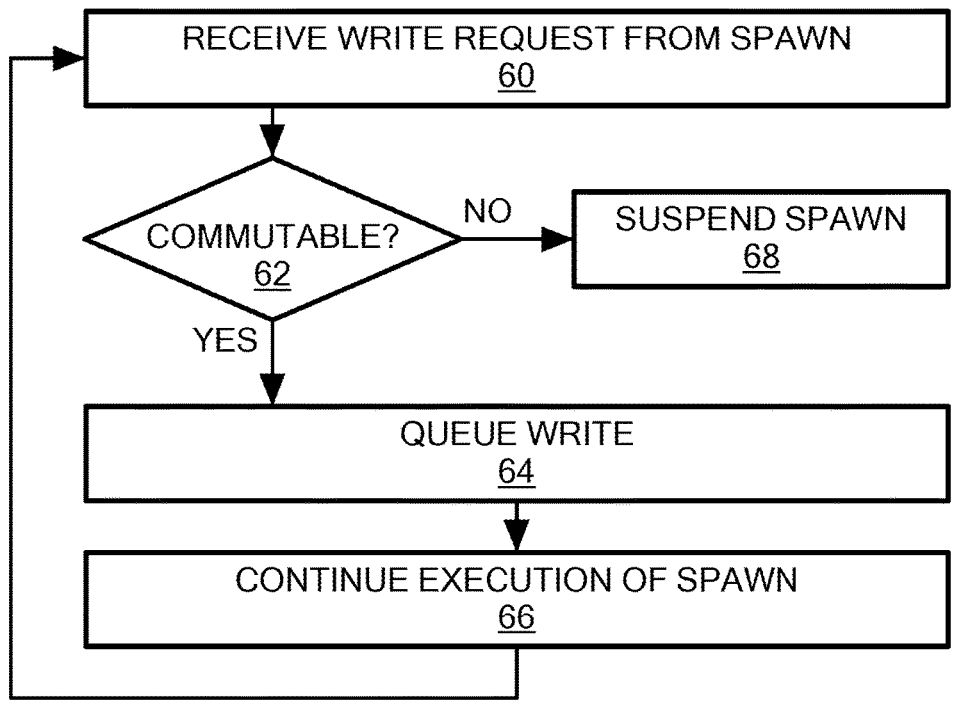
FIG. 5 shows a method in which spawn can continue to work during a checkpoint interval by queuing writes to memory.

Referring now to FIG. 5, in this fourth optimization method, a node 10 receives a write request from a younger-generation spawn 22B (step 60) at a time when normally the younger-generation spawn 22B would not be permitted to write to memory 12. However, in this method, the node 10 distinguishes between commutable operations and non-commutable operations (step 62). If the proposed write is commutable, the node 10 queues it (step 64). The younger-generation spawn 22B then continues execution (step 66). This allows the younger-generation spawn 22B to continue processing past the first time it tries to write to working-memory 12. As a result, younger-generation spawn 22B continue to execute during the checkpoint interval 32 for as long as any write operations carried out by that younger-generation spawn 22B are commutable. On the other hand, if the proposed write is a non-commutable write, then the node 10 suspends execution of the younger-generation spawn 22B (step 68).

In addition to non-commutable writes, there may be other conditions in which a spawn 22B may be allowed to write under conditions when it would normally not be able to do so. One other example arises when a younger-generation spawn 22B, after having inspected memory 12, recognizes that no further memory access by an older-generation spawn 22A is possible.

A fifth optimization method is one that reduces the latency that arises because the outgoing-message escrow area 30 does not release outgoing messages 28 until a checkpoint interval 32 is complete and all computations associated with generating the outgoing messages 28 have been committed to durable storage 16. The idea of waiting until the end of a checkpoint interval 32 before releasing messages 28 from outgoing-message escrow area 30 is useful where the consequences of sending the wrong message are severe. However, there are times when the consequence of sending an incorrect message is minimal, but the consequence of sending a delayed message is severe.

As an example, consider the case in which the outgoing message 28 is a coupon for goods in a particular retail store. Suppose the apparatus has detected that a user is in the vicinity of that particular retail store at a particular instant. Obviously, it would be desirable to transmit the message 28 immediately, before the user has had a chance to leave the retail store. If this message 28 were to languish on the outgoing-message escrow area 30 waiting to be sent, the opportunity for the coupon to be useful would be lost. On the other hand, if that coupon were the result of a computation that was subsequently lost because of a failure in the node 10, it is unlikely anybody would complain. After all, the store would have made a sale it might not otherwise have made, and the user would have obtained a good at some discount.

This fifth optimization method, in which outgoing messages 28 are released without waiting for the underlying data to be committed to durable storage 16, presupposes that time is of the essence in delivering an outgoing message 28, and that the cost of an incorrect or inconsistent outgoing message 28 is minimal in comparison with adverse consequences of its late delivery. In the fifth optimization method, outgoing messages 28 are released from the outgoing-message escrow area 30 prior to completion of the checkpoint interval 32 or bypass the outgoing-message escrow area 30 completely.

Figure 6:
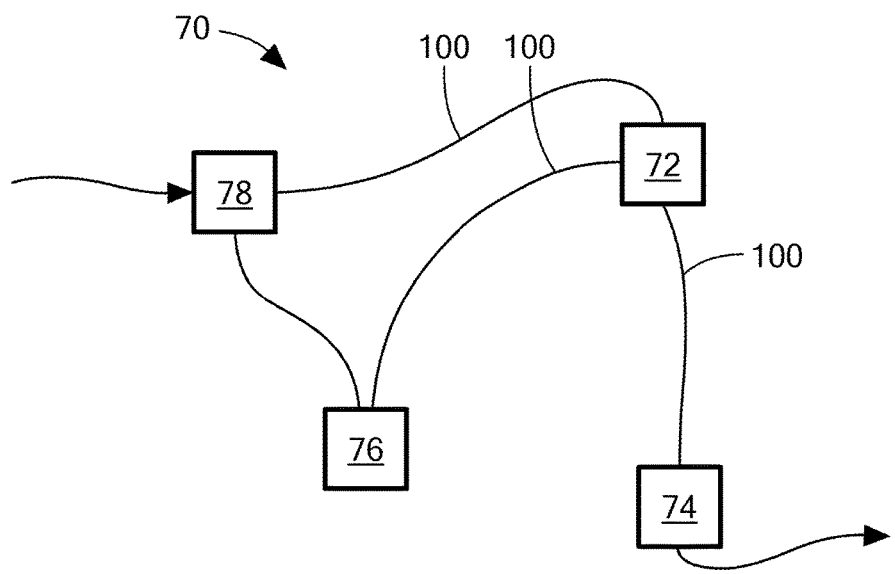
FIG. 6 shows a multi-node computing apparatus.

FIG. 6 shows a multi-node apparatus 70 in which multiple nodes 72, 74, 76, 78 of the type described in connection with FIGS. 1-6 are in communication with each other and cooperate with each other in carrying out data processing. In such a case, a task may send a message from a first node 72 to a second node 74.

In some cases the message may have the effect of migrating a task from the first node 72 to the second node 74. A task that migrates from one node to another is referred to as a "migrant" task. Depending on point-of-view, a migrant task is either an "immigrant" task or an "emigrant" task. From the point of view of the first node 72, the migrant task is an "emigrant" task because the task is leaving the first node. Conversely, from the point of view of the second node 74, the migrant task is an "immigrant" task because it is arriving at the second node 74.

In other cases the message might be a remote procedure call or a remote data access request such that the requesting task cannot proceed until it receives a message in return. In other cases the task may simply asynchronously transmit information from the first node 72 to the second node 74 using the message. A computing system such as that described in U.S. patent application Ser. No. 14/842,956, entitled "EXECUTING GRAPH-BASED PROGRAM SPECIFICATIONS," filed on Sep. 2, 2015, incorporated herein by reference, for example, can be configured using the techniques for promoting fault tolerance and recovery described herein.

In such a case, application of the foregoing methods would be less than optimal in part because a message 80 from the first node 72 to the second node 76 cannot be transmitted until it is released from escrow at the completion of the next checkpoint interval 32. This introduces considerable latency. While this latency could potentially be reduced by exempting messages transmitted from node to node within the multi-node apparatus 70 from being escrowed, such an exemption is not sufficient due to indeterminism.

For example, this and other difficulties arise when multiple nodes 72, 74, 76, 78 are present because many computations are non-deterministic. Examples of such non-deterministic computations are those in which results depend on the order in which reads and writes occur, those that rely on real time clocks, and those that rely on the outcome of a random number generator, an example of which has already been described above in connection with the desirability of an outgoing-message escrow area 30.

If a first node 72 communicates with a second node 74, then loses contact (e.g., due to failure) before the next checkpoint interval 32, the apparatus 70 may end up with inconsistencies owing to this non-determinism as follows. After the failure the apparatus 70 will recover the first node 72 from the most recent checkpoint and restart the computation. The computation may be restarted from a point in the computation before transmission of a message from the first node 72 to the second node 74. Owing to the non-deterministic nature of the computations, the first node 72 may well send a completely different message to the second node 74 after recovery from the checkpoint. But, that second node 74 may have already received the original message, potentially placing the two nodes 72 and 74 in an inconsistent state. For example, node 72 is in a state in which it has sent node 74 the "new" version of the message, but node 74 is in a state in which it has already acted on the "old" version of the message. Furthermore, node 74 may have sent a message to yet another node 76, based on that original message received from node 72, so node 72 and node 76 are also may also be in an inconsistent state. Thus, inconsistency may spread through all nodes in the apparatus 70 like a virus.

One way to avoid the foregoing difficulty is to ensure that all the nodes 72, 74, 76, 78 synchronize their checkpoints, for example, using a 'barrier sync' operation, as follows. A 'checkpoint leader' transmits a message to all nodes commanding them to begin a checkpoint interval. Then, after each checkpoint is complete, each node responds to the checkpoint leader affirming that the checkpoint is complete. When the checkpoint leader has received affirmations from all nodes, it will then command all nodes to commit the checkpoint and then resume processing.

This approach forms the basis of a solution to the multi-node checkpoint problem, but does not completely solve it for two reasons. First, in a multi-node apparatus it is possible that some nodes survive a failure, in which case the surviving nodes must be rolled back from their current state to the checkpoint state (rather than being rolled forward to the checkpoint state). Second, when the checkpoint is performed there may be messages in transit, which might allow non-determinism to leak from the old processing interval, across the checkpoint, and into the new processing interval.

In a single-node apparatus, if the node 10 fails, it only has to roll forward to recover uncommitted work. But in a multi-node apparatus 70, other nodes 72, 74, 76, which did not fail, may have to roll backward when a node 78 fails. This mechanism, in which a distributed apparatus 70 recovers by having some nodes 78 roll forward and other nodes 72, 74, 76 roll backward means that in effect, all nodes 72, 74, 76, 78 can be made to restart at the same checkpoint. The resulting apparatus 70 thus achieves the effect of simultaneous checkpoints across all nodes. It does not, however, do so by trying to actually synchronize operation across all nodes, which as noted above is difficult. Instead, it does so by manipulating the states of the nodes 72, 74, 76, 78 to reap the benefits of synchronized checkpoints without actually having to provide such checkpoints.

Figure 7:
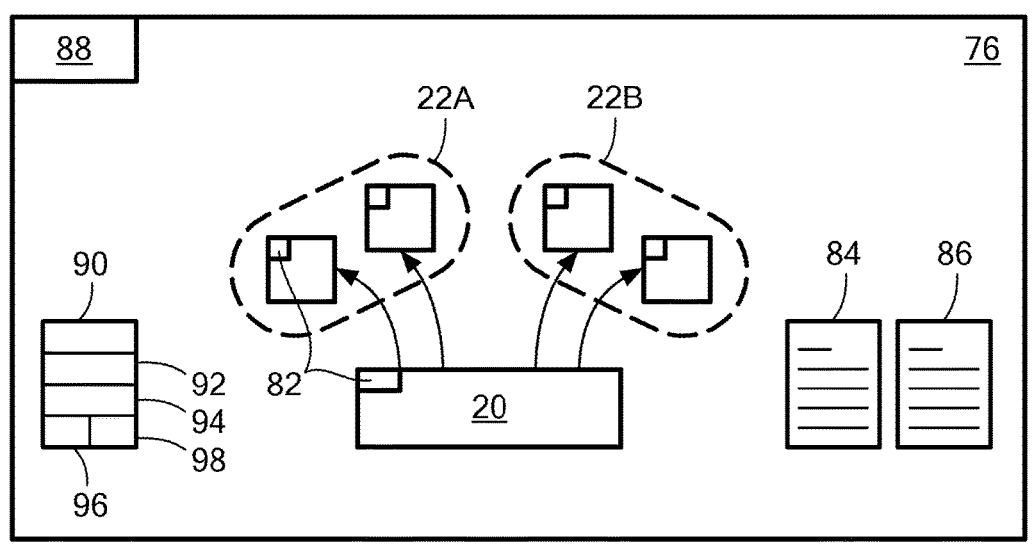
FIG. 7 shows two generations co-existing in a node from the apparatus of FIG. 7.

To implement the foregoing recovery method, the nodes 72, 74, 76, 78 execute a distributed checkpoint method as described in detail below. Referring to FIG. 7, when implementing the distributed checkpoint method, every process and every message acquires a generation count 82. In addition, a running count 84 is maintained of the tasks associated with each checkpoint. Each node also maintains a spawner-registry 86 of its spawners 20. Additionally, each node 72 maintains a nodal generation count 88.

The nodal generation count 88 enables a node 76 to enforce a generation gap in which work carried out by younger-generation spawn 22A and work carried out by older-generation spawn 22B do not interfere with each other. As a result of the generation gap, the older generation and the younger generation can more or less ignore each other. In effect, the node 76 becomes two virtual machines, one seen by the older-generation spawn 22A and another seen by the younger-generation spawn 22B. These two virtual machines coexist on the same physical platform but are otherwise orthogonal to each other.

In addition, each node 76 also implements a bidirectional journal 90 that enables that node 76 to roll forward or backward to a particular state as needed. The bidirectional journal 90 includes changes to working storage 92, a listing of checkpointed task states 94, and checkpointed messages 96. These elements provide a way to roll forward in time. In addition, the bidirectional journal 90 features an undo log 98 in memory 12 to enable the node 76 to roll backward in time. In general, rolling forward in time is how a failed node recovers. Rolling backward in time is what a node does when another node in the apparatus 70 has failed.

In operation, as shown in FIG. 6, a master node 72 transmits a checkpoint message 100 to all other nodes 74, 76, 78, i.e. "slave nodes," indicating that a checkpoint is due. However, there is no requirement that this checkpoint occur at the same time in all nodes 72, 74, 76, 78.

Figure 8:
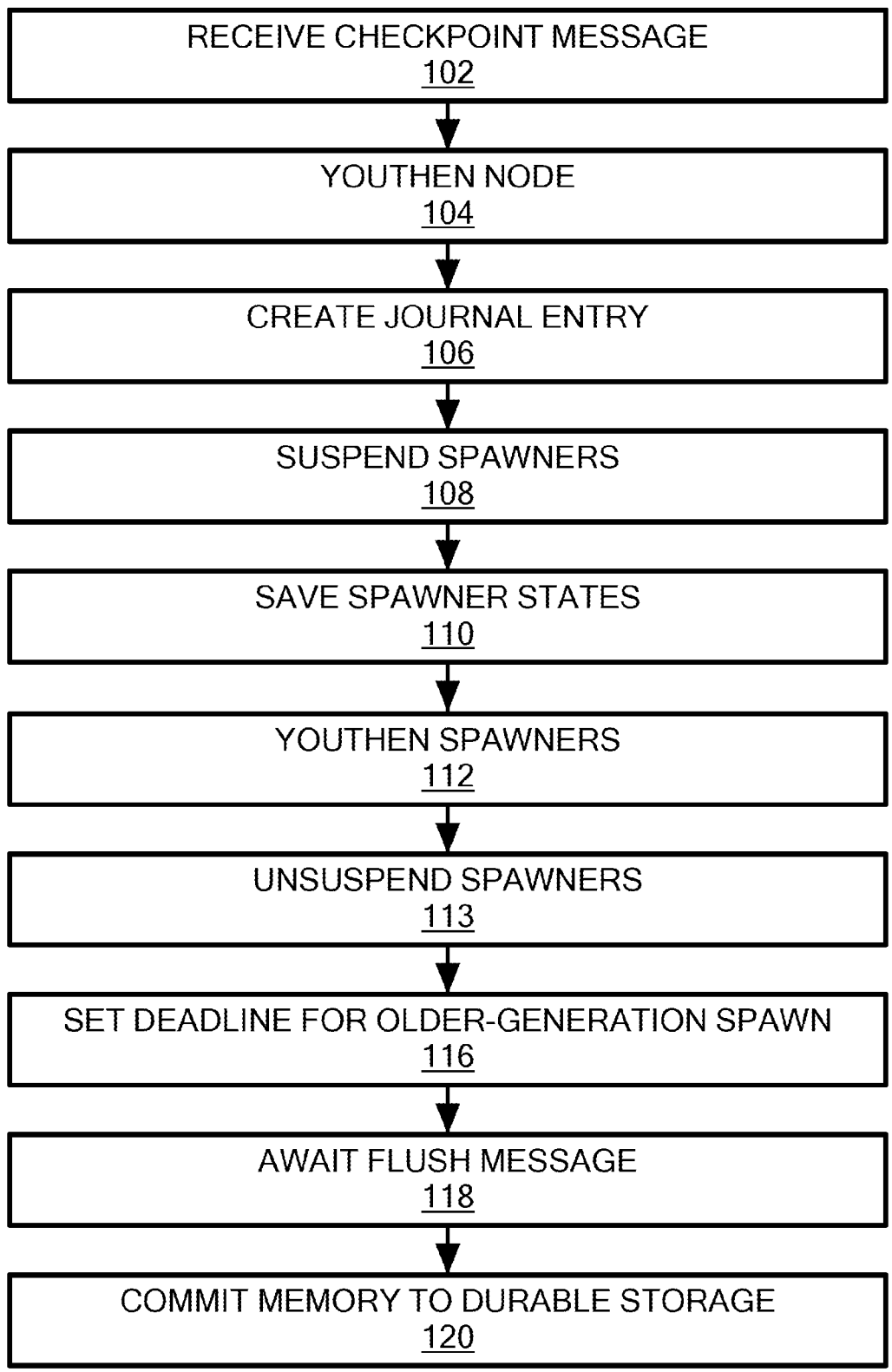
FIG. 8 shows method steps carried out by a slave node in response to a checkpoint message.

FIG. 8 shows a flowchart for an exemplary fault-tolerance and recovery procedure in the presence of computational indeterminism. In response to receiving a checkpoint message (step 102), a slave node 76 will not immediately begin a checkpoint interval. As noted above, this is impractical. Instead, the slave node 76 increments its nodal generation count 88 (step 104) and create a journal entry indicating the incrementing of its nodal generation count 88 (step 106).

The slave node 76 then suspends all of its spawners 20 (step 108), and writes their states to the bidirectional journal 90 (step 110). Then, for each of its spawners 20, the slave node 76 increments that spawner's generation count 82 (step 112). With its generation count 82 having been incremented, the spawner 20 is allowed to resume operation (step 114). However, since the spawner's generation count 82 will have been incremented, any resulting spawn 22B will be in the younger generation.

At this point, two generations will co-exist in the slave node 76. The older-generation spawn 22A, namely those having a generation count that is one less than the node's generation count, can continue to process to completion, writing to memory 12 as necessary. The younger-generation spawn 22B, namely those whose generation counts match the nodal generation count 88, may process until it is time to write to memory 12. At that point, younger generation spawn 22B are blocked.

It should be noted that in the description thus far, there are only two generations of spawn involved: older-generation spawn 22A, whose generation count 82 is one less than the nodal generation count 88, and a younger-generation spawn 22B, whose generation count 82 matches the nodal generation count 88. However, in principle there is no reason that more than two generations cannot coexist on the same platform.

Figure 9:
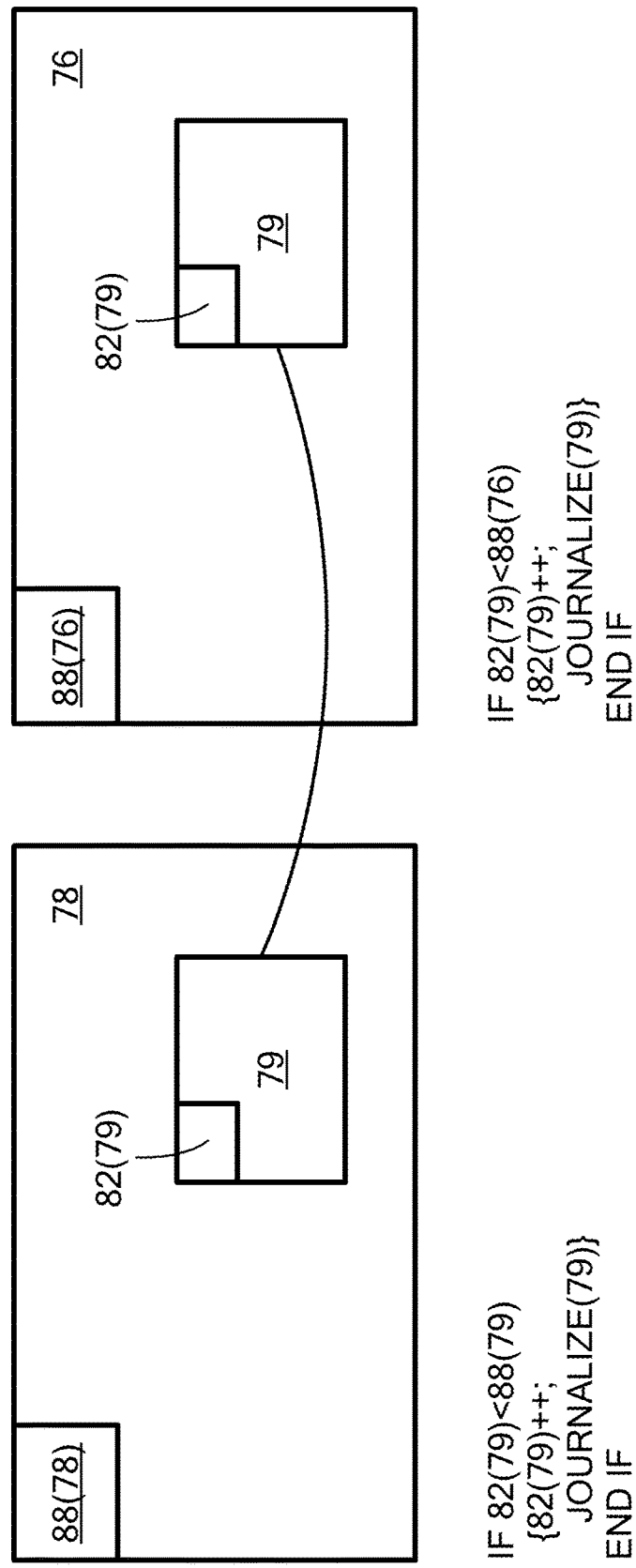
FIG. 9 shows method steps involving incrementing a migrant generation count.

Referring to FIG. 9, in a multi-node apparatus 70, it is possible for a task 79 to emigrate from a sending node 78 and immigrate into a receiving node 76. As described in connection with FIG. 6, such a task 79 is referred to as a "migrant task" or a "migrant."

In the following discussion, it is necessary to refer to values associated with particular objects. To avoid ambiguity with reference numerals in the figures, and in a manner consistent with standard mathematical notation, the parentheses will be used to mean "of." Thus, since "88" has been assigned to "nodal generation count" and "76" is a node, the nodal generation count 88 of node 76 will be written as 88(76).

A difficulty can arise when the migrant's generation count 82(79) is not the same as the nodal generation count 88(76) of the receiving node 76. These difficulties can be avoided by implementing message escrow areas between nodes. But this would reintroduce the latency that the distributed checkpoint method was intended to avoid in the first place.

According to the distributed checkpoint method, there are three possibilities: the sending node's nodal count 88(78) is the same as the receiving node's nodal count 88(76); the sending node 78 has a lower nodal generation count 88(78) than the receiving node's nodal count 88(76); and the sending node 78 has a higher nodal generation count 88(78) than the receiving node's 88(76).

In the first possibility, a migrant will have the same generation count 82(79) as the nodal count 88(78) of the sending node 78. Therefore, the sending node 78, the receiving node 76, and the migrant 79 all have the same generation count. In that case, nothing special has to be done.

The second possibility can arise when the receiving node 76 increments its generation count 88(76) while the migrant 79 is in transit. This means that, upon immigrating into the receiving node 76, the migrant 79 presents itself as a member of what has now become the older generation of the receiving node 76. In that case, the receiving node 76 will youthen the migrant 79 by incrementing the migrant's generation count 82(79). As a result, the migrant task 79 will be able to continue processing, but, like the rest of the younger generation spawn 22B, it will be blocked from writing to memory 12. The youthening of the migrant 79 is then journalized at the receiving node 76. Since the act of youthening takes place at the receiving node 76, it is referred to as "immigrant-side youthening."

The third possibility can arise when the sending node 78 will increment its generation count 88(78) before the migrant 79 has emigrated. In that case, the sending node 78 youthens the migrant 79 by incrementing the migrant's generation count 82(79) before it is sent, and journalizes the youthening event at the sending node. Since the act of youthening takes place at the sending node 78, it is referred to as "emigrant-side youthening."

In either case, a node 76 that has received a checkpoint message from a master node will set a deadline to allow the older-generation spawn 22A to finish execution, thereby insuring near-extinction of the older generation, and avoiding the need to record their states (step 116). Nevertheless, there may be spawn 22A of the older generation that are slow to terminate. It is impractical for a node 76 to wait for an extended period for once the deadline is reached, any older generation spawn 22 that is still running will be suspended, serialized, journaled, and youthened, after which it is allowed to resume execution subject to the constraint that it not write to the working-memory 12 until after the working-memory 12 has been committed to durable storage 16.

The slave node 76 will not begin the actual checkpoint until it knows that no more older-generation immigrants are expected to arrive. In order to implement this, whenever a node 72 recognizes that all older-generation emigrants have successfully emigrated, it broadcasts a flush message to all other nodes 74, 76, 78. Once the slave node 76 has received flush messages from all nodes 72, 74, 78, it knows that the flow of older-generation immigrants has been quenched (step 118). Younger-generation immigrants may still arrive at a slave node 76, just as younger-generation emigrants may still leave from the slave node 76. However, these younger-generation emigrants are not pertinent to the checkpoint process.

At this point, the slave node 76 is now ready to commit its working-memory 12 to durable storage 16 (step 120). This is carried out in the same manner described above for the single-node case.

Figure 10:
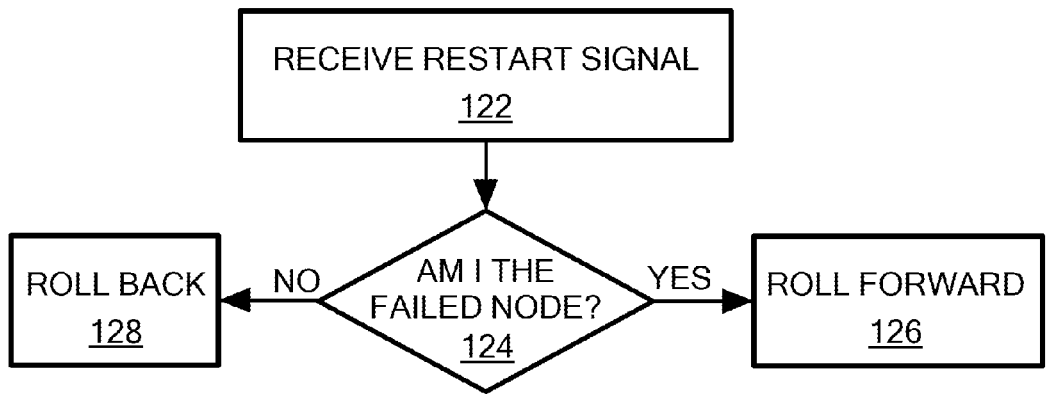
FIG. 10 shows method steps for recovery after failure.

The procedure for restarting after failure of a node, shown in FIG. 10, depends on whether the node involved is one that failed or not. After receiving an instruction to restart (step 122), the node determines if it is the node that failed, or if another node in the apparatus 70 failed (step 124). If the node is one that failed, it retrieves the log and rolls forward from its last valid checkpoint (step 126). If the node is not one that failed (i, it rolls back to its last checkpoint (step 128).

An example of a "roll back" operation involves the following steps: (1) terminate all tasks currently running (including both spawners and spawn); (2) use the bidirectional journal entries to undo any changes to memory.

After any failed nodes have been rolled forward and any surviving nodes have been rolled back, the apparatus 70 may also perform other operations as part of restarting the tasks. For example, the apparatus 70 may perform the following operations: (1) flush the communications network to ensure that all messages predating the failure have been discarded, (2) restart all tasks that were part of the checkpoint by retrieving their saved state from the journal and restarting them, (3) retransmit any messages that were not sent prior to the checkpoint, and (4) process any messages were received but not yet processed as of the checkpoint.

Figure 11:
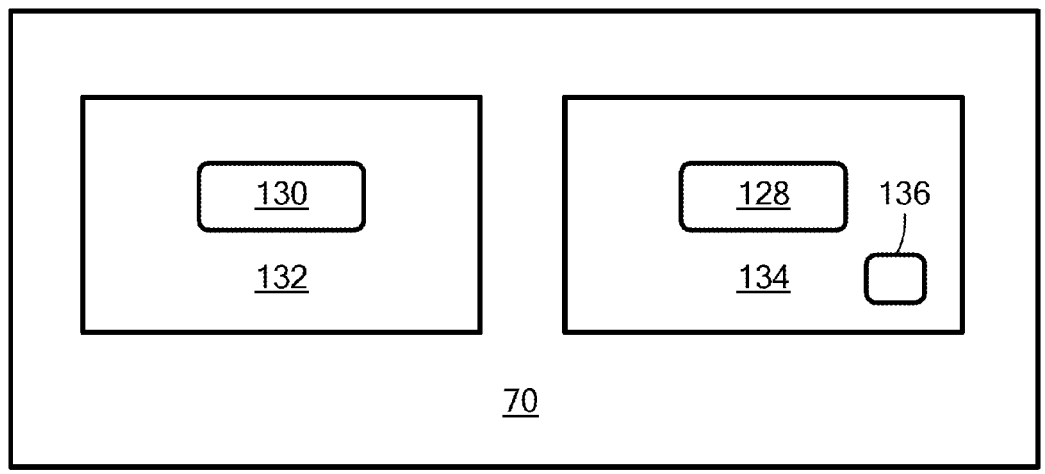
FIG. 11 shows a replica maintained at another node to enable more rapid recovery.

The task of rolling forward from the last valid checkpoint on a failed node is one that is potentially time-consuming. Referring to FIG. 11, in some practices, it is useful to maintain a replica 128 of memory 130 from a first node 132 on a second node 134. Preferably, the second node 134 does not have the same failure mode as the first node 132. In normal operation, the replica 128 is synchronized with the memory 130 at the first node 132 at each checkpoint. The replica 128 also has an associated undo log 136 to enable it to roll backward to its state at the most recent checkpoint.

Figure 12:
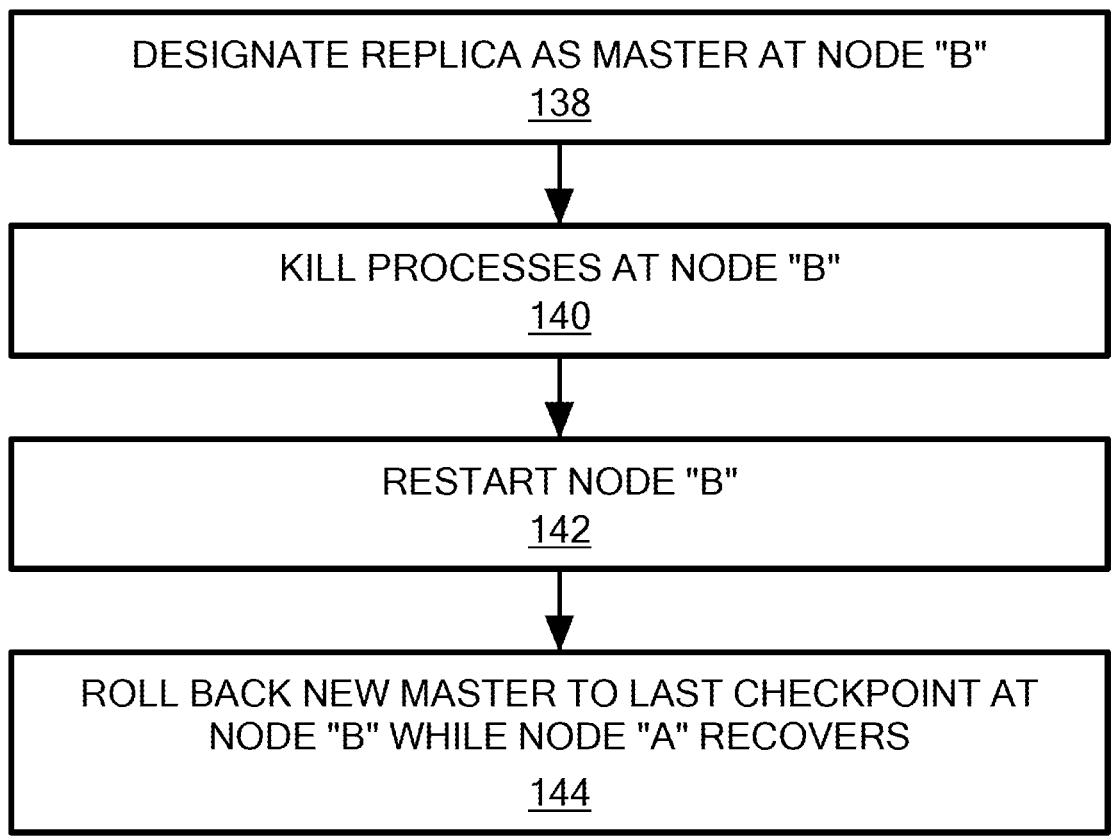
FIG. 12 shows a procedure for using the replica shown in FIG. 11 for rapid recovery.

Referring now to FIG. 12, upon failure of the first node 132, the replica 128 at the second node 124 is designated a master (step 138). All processes on the second node 124 are killed (step 140), after which the second node 134 is restarted (step 142). The former replica 128, which now serves as a master copy, is rolled back to the last checkpoint with the aid of the undo log 136 (step 144). Operation of the multi-node apparatus 70 can then resume with the wait for recovery being on the order of the roll-back time. This is typically much shorter than the roll-forward time. Meanwhile, the recovered first node 132 can proceed to roll-forward to the correct state without slowing down the overall recovery of the multi-node apparatus 70. Once the first node 132 is ready, it takes over as master again, and the former replica 128 becomes a replica again.

Although FIG. 11 shows only one second node 134, it is understood that there can be more than one second node, each of which has a replica 128 and an undo log 136. In that case, upon failure of the first node 132, one of the second nodes must be elected to serve as proprietor of the new master copy of the first node's memory.

In some cases, there may be many idempotent operations. In such cases, instead of rolling forward it is not unreasonable to simply repeat computations that would carry out idempotent operations since those computations would not cause any harm.

The end result of recovery is that all points are at a state consistent with the transition from one generation to the next. As a result, no work from older-generation processes is lost, but all work done by younger generation processes is lost. This ensures a state that is consistent across all nodes. In this context, a state is "consistent" if it could have been arrived at in the absence of any fault. In contrast, a state is "inconsistent" if it can only be explained by the occurrence of one or more faults.

Figure 13:
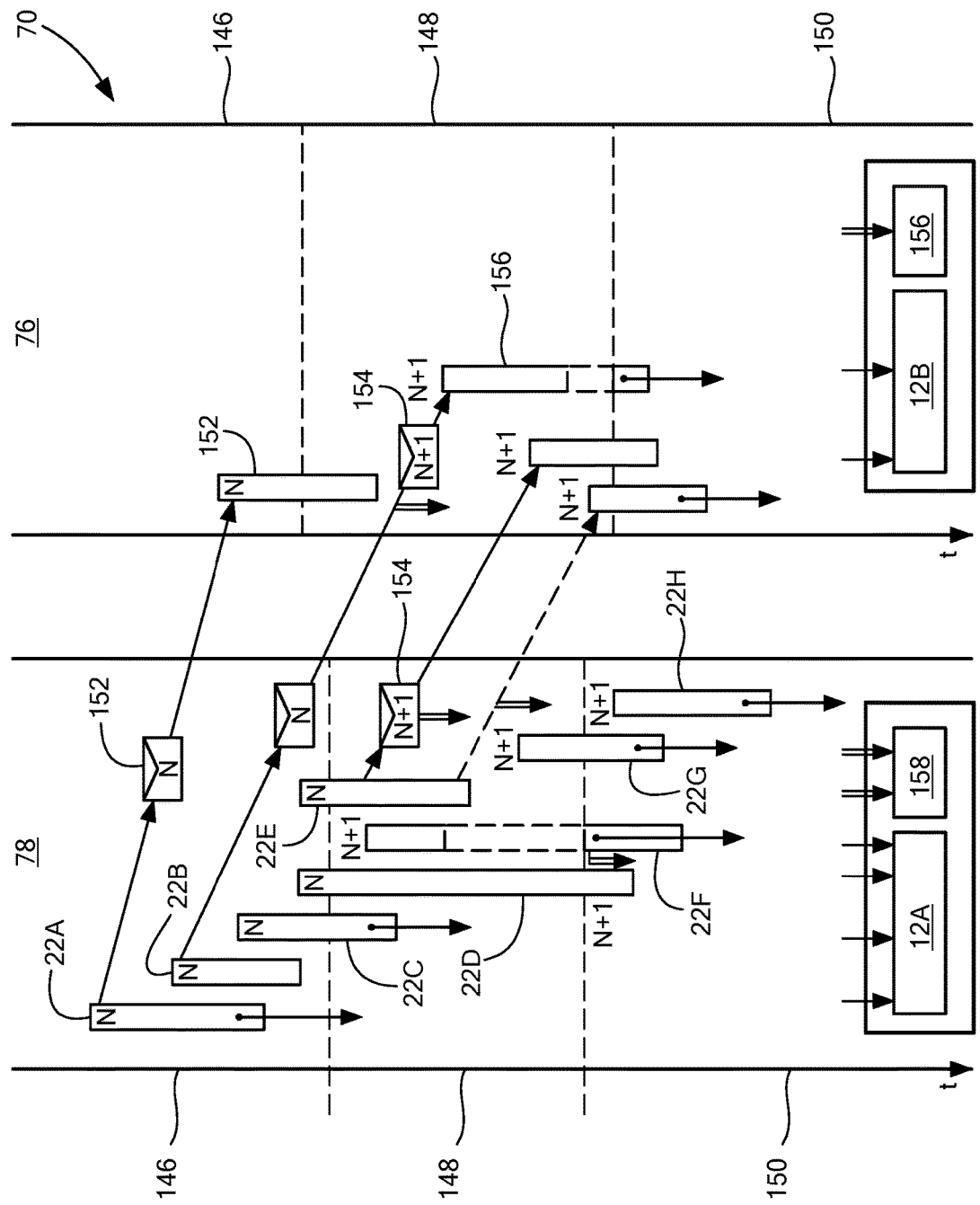
FIG. 13 shows an example of execution of the method shown in FIG. 5 in connection with multiple nodes as illustrated in FIG. 9.

FIG. 13 illustrates the states of several spawned processes in both the sending node 78 and receiving node 76 in the multi-node apparatus 70 referred to in connection with FIGS. 6 and 9. In FIG. 13, time increases downward along the vertical axis. The time axis shows a first interval 146, a second interval 148 following the first interval 146, and a third interval 150 following the second interval 148.

FIG. 13 shows several spawned processes 22A-H, each of which has an associated generation count. Spawn having a generation count of N will be referred to herein as "first-generation spawn." Spawn having a generation count of N+1 will be referred to herein as "second-generation spawn." The adjectives "first-generation" and "second-generation" will also be used to refer to other entities that are tagged with a generation count, including nodes, migrant tasks, and spawned process.

During the first interval 146, the sending node 78 is a first-generation node. During the second and third interval 150, the sending node 78 is a second-generation node. It should be noted that this progression of nodes is cyclic so that the third interval 150 will be followed by an interval that plays the same role, for the second generation, that the second interval 148 played for the first generation. This same progression occurs on the receiving node 76, though not necessarily in synchrony with the progression occurring at the sending node 78. For convenience, the same reference numbers are used to designate intervals in both the sending and receiving nodes 78, 76. However, this is not meant to imply that they are synchronized.

During the first interval 146, a spawning process 20 spawns various first-generation spawned processes 22A-22E. Throughout this first interval 146, any first-generation spawned process 22A-22E is free to write to a sending-node memory 12A.

During the second interval 148, the sending node 78 becomes a second-generation node. As such, the spawning process 20 now spawns only second-generation spawned processes. During this second interval 148, any first-generation spawned processes 22A-22E remain free to write to the sending-node memory 12A. Second-generation spawned processes 22F-22G are free to execute, but are forbidden from writing to the sending-node memory 12A. The purpose of this second interval 148 is therefore to allow any residual first-generation spawn 22C, 22D, 22E some time to finish executing before a checkpoint interval 32 occurs.

During the third interval 150, the spawning process 20 spawns another second-generation spawned process 22H. During this third interval 150, no first-generation spawn remain, and all second-generation spawn 22F-22H are free to write to the sending-node memory 12A.

At the sending node 78, a first first-generation spawned process 22A, a second first-generation spawned process 22B, a third first-generation spawned process 22C, a fourth first-generation spawned process 22D, and a fifth first-generation spawned process 22E all begin execution during the first interval 146. However, of these, only the first first-generation spawned process 22A and the second first-generation spawned process 22B manage to finish execution during the first interval 146. The third first-generation spawned process 22C manages to finish during the second interval 148. The fourth first-generation spawned process 22D takes so long it cannot finish until the third interval 150 has already begun. The fifth first-generation spawned process 22E never actually finishes at the sending node 78. Instead, it migrates to the receiving node 76 part way through the second interval 148. It does so while the receiving node 76 is still in its own second interval 148.

During execution, the first first-generation spawned process 22A writes to the sending-node memory 12A during the first interval 146 and the third first-generation spawned process 22C writes to the sending-node memory 12A during the second interval 148. The second first-generation spawned process 22B does not write to the sending-node memory 12A at all during execution. The fifth first-generation spawned process 22E eventually writes to the sending-node memory 12A, but only at the receiving node 76.

During the second interval 148, a first second-generation spawned process 22F and a second second-generation spawned process 22G both begin execution. Sometime during the second interval 148, the first second-generation spawned process 22F reaches a point at which it must write to the sending-node memory 12A. However, since it is still the second interval 148, it is forbidden from writing to the sending-node memory 12A. Therefore, it becomes suspended, as indicated by the dashed lines. Once the third interval 150 begins, the first second-generation spawned process 22F writes to the sending-node memory 12A and completes execution.

Meanwhile, the second second-generation spawned process 22G has started late enough during the second interval 148 so that by the time it actually has to write to the sending-node memory 12A, the third interval 150 has already begun. Accordingly, the second second-generation spawned process 22G executes without interruption.

A third second-generation spawned process 22H begins during the third interval 150. This is essentially a mirror image of the first first-generation spawned process 22A.

In the course of execution, the first first-generation spawned process 22A causes a first task 152 to migrate to the receiving node 76. The first task 152 inherits the generation number of the first first-generation spawned process 22A. As such, it begins its existence as a first-generation task. This first task 152 arrives at the receiving node 76 while the receiving node 76 is still operating in the first interval 146. The receiving node 76 is thus acting as a first-generation node. Accordingly, the first task 152 is free to execute and to write to a receiving-node memory 12B provided it does so before a third interval 150 begins on the receiving node 76.

Also in the course of execution, the second first-generation spawned process 22B causes a second task 154 to migrate to the receiving node 76. The second task 154 inherits the generation number of the first first-generation spawned process 22A. As such, it starts its existence as a first-generation task. However, this second task 154 arrives at the receiving node 76 while the receiving node 76 is already operating in its second interval 148. Accordingly, the second task 154 is changed into a second-generation task from a first-generation task. This includes an accompanying step of journalizing the second task 154 in a receiving node journal file 156.

A similar event occurs in connection with the fifth first-generation spawned process 22E at the sending node 78. This fifth first-generation spawned process 22E migrates to the receiving node 76 midway through execution. However, by the time it arrives at the receiving node 76, the receiving node 76 has already begun its own second interval 148. As such, the second node is has become a second-generation node. Therefore, the fifth first-generation spawned process 22E is changed into a second-generation spawned process. This change is accompanied by journalizing the fifth first-generation spawned process 22E in a sending-node journal file 158. The fifth first-generation spawned process 22E then continues execution on the receiving node 76, though as a second-generation spawned process.

Meanwhile, back at the sending node 78, the fourth first-generation spawned process 22D has not yet finished execution by the end of the second interval 148. At this point, the fourth first-generation spawned process 22D is both journalized at the sending-node journal file 158 and has its generation count incremented so that it now becomes a second-generation spawned process. The fourth first-generation spawned process 22D then continues to execute during the third interval 150.

It should be noted that the fourth first-generation spawned process 22D sustained the same two steps that were sustained by the fifth first-generation spawned process 22E during its migration to the receiving node 76, namely a journalizing step, and a generation change. Thus, it is not unreasonable to say that fourth first-generation spawned process 22D in some sense also migrated. The main difference is that the fifth first-generation spawned process 22E underwent an inter-node migration whereas the fourth first-generation spawned process 22D underwent an intra-node migration.

The checkpoint and recovery method described herein is thus based on the recognition that the desirability of simultaneously executing checkpoints across multiple nodes does not stem from temporal synchronicity but rather from a side effect of temporal synchronicity. The method thus reproduces the side effect of temporal synchronicity of checkpoints across multiple nodes without actually having to achieve it.

The fault-tolerance and recovery approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

I claim:

1. A method for promoting fault tolerance and recovery in a computing system including at least one processing node, said method including: promoting availability and recovery of a first processing node, wherein promoting availability and recovery includes, at a first processing node,
executing a spawner at said node, wherein said spawner, in the course of execution, generates a first spawn, wherein executing said spawner includes assigning, to said spawner, a first generation indicator, wherein said first spawn inherits said first generation indicator;
beginning a checkpoint interval, at the end of which nodal recovery information, which is usable for recovery of said node, is committed to durable storage, wherein beginning said checkpoint interval includes
suspending said spawner from generating spawn,
assigning, to said spawner, a second generation indicator that differs from said first generation indicator,
resuming said spawner, thereby enabling said spawner to generate a second spawn, wherein said second spawn inherits said second generation indicator, and controlling an extent to which said second spawn writes to memory; and after committing said nodal recovery information, releasing control over said extent to which said second spawn can write to memory.

2. The method of claim 1, wherein controlling an extent to which said second spawn writes to memory includes preventing said second spawn from completing a write to said memory.

3. The method of claim 2, further including permitting said second spawn to queue said write to memory for eventual completion thereof after said recovery information has been committed.

4. The method of claim 1, wherein controlling an extent to which said second spawn writes to memory includes determining that said write operation is a commutable operation, and allowing completion of said commutable operation.

5. The method of claim 4, wherein determining that said write operation is a commutable operation includes determining that said write operation includes incrementing a variable.

6. The method of claim 4, wherein determining that said write operation is a commutable operation includes determining that said write operation includes inserting a record at a specified location.

7. The method of claim 1, further including, after suspending said spawner, setting a deadline, thereby providing time for any spawn having said first generation indicator to execute to completion, and avoiding overhead associated with having to save states of said spawn having said first generation indicator.

8. The method of claim 7, further including suspending said first spawn if said first spawn is still executing as of said deadline.

9. The method of claim 7, further including enabling said first spawn to avoid suspension as a result of having failed to complete execution by said deadline.

10. The method of claim 9, wherein enabling said first spawn to avoid suspension as a result of having failed to complete execution by said deadline includes changing said first generation indicator to said second generation indicator in said first spawn if said first spawn is still executing as of said deadline.

11. The method of claim 1, wherein said first node has a nodal-generation indicator, said method further including causing a spawn to become a migrant that migrates to a second node, wherein said second node has a nodal-generation indicator.

12. The method of claim 11, wherein said nodal-generation indicator of said second node indicates that said second node is in a younger generation than said first node, wherein said method further includes youthening said migrant.

13. The method of claim 12, wherein youthening said migrant includes immigration-side youthening of said migrant.

14. The method of claim 12, wherein youthening said migrant includes emigration-side youthening of said migrant.

15. The method of claim 1, wherein said first node is a node in a multi-node system in which each node has a nodal generation-count, wherein said multi-node system includes at least a second node, wherein, upon recovery following a failure of said second node, said first node rolls back to a state that corresponds to a nodal-generation count of said second node.

16. The method of claim 1, wherein said first node is a node in a multi-node system in which each node has a nodal generation-count, wherein said multi-node system includes at least a second node, wherein, upon recovery following a failure of said first node, said first node rolls forward to a state that corresponds to a nodal-generation count of said second node by restoring committed work from a checkpoint and restoring uncommitted work from a journal.

17. The method of claim 1, wherein said first node is a node in a multi-node system in which each node has a nodal generation-count, said method including, at said first node,
receiving, from a master node, a message indicating that a checkpoint is to be carried out,
in response, youthening a nodal generation count of said first node,
suspending spawners from generating spawn,
saving spawner recovery information for recovering spawner states,
resuming said spawners,
determining that no further older-generation immigrants are expected at said first node, and
in response to said determination, committing, to said durable storage, said nodal recovery information.

18. The method of claim 17, further including setting a deadline, and, upon lapse of said deadline, suspending all older-generation spawn that are still executing while younger-generation spawn continue to execute, wherein said older-generation spawn and said younger-generation spawn are relative to a particular generation indicator.

19. The method of claim 1, wherein said first node is a node in a multi-node system, said method including saving a replica copy of working memory of said first node at said second node, upon failure of said first node, temporarily using said replica copy for processing that would otherwise have been carried out by said first node, and, upon recovery of said first node, communicating, to said first node, information required to update memory in said first node so that subsequent computation can be carried out by said first node.

20. A non-transitory medium, storing software for promoting fault tolerance and recovery in a computing system including at least one processing node, the software including instructions for causing a computing system to: promote availability and recovery of a first processing node, wherein promoting availability and recovery includes, at a first processing node,
executing a spawner at said node, wherein said spawner, in the course of execution, generates a first spawn,
wherein executing said spawner includes assigning, to said spawner, a first generation indicator,
wherein said first spawn inherits said first generation indicator;
beginning a checkpoint interval, at the end of which nodal recovery information, which is usable for recovery of said node, is committed to durable storage, wherein beginning said checkpoint interval includes
suspending said spawner from generating spawn,
assigning, to said spawner, a second generation indicator that differs from said first generation indicator,
resuming said spawner, thereby enabling said spawner to generate a second spawn, wherein said second spawn inherits said second generation indicator, and
controlling an extent to which said second spawn writes to memory; and
after committing said nodal recovery information, releasing control over said extent to which said second spawn can write to memory.

21. A computing system including:
a data storage system including durable storage; and
one or more processing nodes including least one processor configured to promote availability and recovery of
a first processing node, wherein promoting availability and recovery includes, at a first processing node,
executing a spawner at said node, wherein said spawner, in the course of execution, generates a first spawn,
wherein executing said spawner includes assigning, to said spawner, a first generation indicator,
wherein said first spawn inherits said first generation indicator;
beginning a checkpoint interval, at the end of which nodal recovery information, which is usable for recovery of said node, is committed to durable storage, wherein beginning said checkpoint interval includes
suspending said spawner from generating spawn,
assigning, to said spawner, a second generation indicator that differs from said first generation indicator,
resuming said spawner, thereby enabling said spawner to generate a second spawn, wherein said second spawn inherits said second generation indicator, and
controlling an extent to which said second spawn writes to memory; and
after committing said nodal recovery information, releasing control over said extent to which said second spawn can write to memory.

22. An apparatus including:
means for durably storing data in durable storage; and
means for promoting availability and recovery of a first processing node, wherein promoting availability and recovery includes, at a first processing node,
executing a spawner at said node, wherein said spawner, in the course of execution, generates a first spawn,
wherein executing said spawner includes assigning, to said spawner, a first generation indicator,
wherein said first spawn inherits said first generation indicator;
beginning a checkpoint interval, at the end of which nodal recovery information, which is usable for recovery of said node, is committed to durable storage, wherein beginning said checkpoint interval includes
suspending said spawner from generating spawn,
assigning, to said spawner, a second generation indicator that differs from said first generation indicator,
resuming said spawner, thereby enabling said spawner to generate a second spawn, wherein said second spawn inherits said second generation indicator, and
controlling an extent to which said second spawn writes to memory; and
after committing said nodal recovery information, releasing control over said extent to which said second spawn can write to memory.

23. The non-transitory medium of claim 20, wherein controlling an extent to which said second spawn writes to memory includes preventing said second spawn from completing a write to said memory.

24. The non-transitory medium of claim 23, further storing instructions for causing the computing system to permit said second spawn to queue said write to memory for eventual completion thereof after said recovery information has been committed.

25. The non-transitory medium of claim 20, wherein controlling an extent to which said second spawn writes to memory includes determining that said write operation is a commutable operation, and allowing completion of said commutable operation.

26. The non-transitory medium of claim 25, wherein determining that said write operation is a commutable operation includes determining that said write operation includes incrementing a variable.

27. The non-transitory medium of claim 25, wherein determining that said write operation is a commutable operation includes determining that said write operation includes inserting a record at a specified location.

28. The non-transitory medium of claim 20, further storing instructions for causing the computing system to, after suspending said spawner, set a deadline, thereby providing time for any spawn having said first generation indicator to execute to completion, and avoiding overhead associated with having to save states of said spawn having said first generation indicator.

29. The non-transitory medium of claim 28, further storing instructions for causing the computing system to suspend said first spawn if said first spawn is still executing as of said deadline.

30. The non-transitory medium of claim 28, further storing instructions for causing the computing system to enable said first spawn to avoid suspension as a result of having failed to complete execution by said deadline.

31. The non-transitory medium of claim 30, wherein enabling said first spawn to avoid suspension as a result of having failed to complete execution by said deadline includes changing said first generation indicator to said second generation indicator in said first spawn if said first spawn is still executing as of said deadline.

32. The non-transitory medium of claim 20, wherein said first node has a nodal-generation indicator, said method further including causing a spawn to become a migrant that migrates to a second node, wherein said second node has a nodal-generation indicator.

33. The non-transitory medium of claim 32, wherein said nodal-generation indicator of said second node indicates that said second node is in a younger generation than said first node, wherein said method further includes youthening said migrant.

34. The non-transitory medium of claim 33, wherein youthening said migrant includes immigration-side youthening of said migrant.

35. The non-transitory medium of claim 33, wherein youthening said migrant includes emigration-side youthening of said migrant.

36. The non-transitory medium of claim 20, wherein said first node is a node in a multi-node system in which each node has a nodal generation-count, wherein said multi-node system includes at least a second node, wherein, upon recovery following a failure of said second node, said first node rolls back to a state that corresponds to a nodal-generation count of said second node.

37. The non-transitory medium of claim 20, wherein said first node is a node in a multi-node system in which each node has a nodal generation-count, wherein said multi-node system includes at least a second node, wherein, upon recovery following a failure of said first node, said first node rolls forward to a state that corresponds to a nodal-generation count of said second node by restoring committed work from a checkpoint and restoring uncommitted work from a journal.

38. The non-transitory medium of claim 20, wherein said first node is a node in a multi-node system in which each node has a nodal generation-count, said method including, at said first node,
receiving, from a master node, a message indicating that a checkpoint is to be carried out,
in response, youthening a nodal generation count of said first node,
suspending spawners from generating spawn,
saving spawner recovery information for recovering spawner states,
resuming said spawners,
determining that no further older-generation immigrants are expected at said first node, and
in response to said determination, committing, to said durable storage, said nodal recovery information.

39. The non-transitory medium of claim 38, further storing instructions for causing the computing system to set a deadline, and, upon lapse of said deadline, suspend all older-generation spawn that are still executing while younger-generation spawn continue to execute, wherein said older-generation spawn and said younger-generation spawn are relative to a particular generation indicator.

40. The non-transitory medium of claim 20, wherein said first node is a node in a multi-node system, said method including saving a replica copy of working memory of said first node at said second node, upon failure of said first node, temporarily using said replica copy for processing that would otherwise have been carried out by said first node, and, upon recovery of said first node, communicating, to said first node, information required to update memory in said first node so that subsequent computation can be carried out by said first node.

41. The computing system of claim 21, wherein controlling an extent to which said second spawn writes to memory includes preventing said second spawn from completing a write to said memory.

42. The computing system of claim 41, the processor further configured to permit said second spawn to queue said write to memory for eventual completion thereof after said recovery information has been committed.

43. The computing system of claim 21, wherein controlling an extent to which said second spawn writes to memory includes determining that said write operation is a commutable operation, and allowing completion of said commutable operation.

44. The computing system of claim 43, wherein determining that said write operation is a commutable operation includes determining that said write operation includes incrementing a variable.

45. The computing system of claim 43, wherein determining that said write operation is a commutable operation includes determining that said write operation includes inserting a record at a specified location.

46. The computing system of claim 21, the processor further configured to, after suspending said spawner, set a deadline, thereby providing time for any spawn having said first generation indicator to execute to completion, and avoiding overhead associated with having to save states of said spawn having said first generation indicator.

47. The computing system of claim 46, the processor further configured to suspend said first spawn if said first spawn is still executing as of said deadline.

48. The computing system of claim 46, the processor further configured to enable said first spawn to avoid suspension as a result of having failed to complete execution by said deadline.

49. The computing system of claim 48, wherein enabling said first spawn to avoid suspension as a result of having failed to complete execution by said deadline includes changing said first generation indicator to said second generation indicator in said first spawn if said first spawn is still executing as of said deadline.

50. The computing system of claim 21, wherein said first node has a nodal-generation indicator, said method further including causing a spawn to become a migrant that migrates to a second node, wherein said second node has a nodal-generation indicator.

51. The computing system of claim 50, wherein said nodal-generation indicator of said second node indicates that said second node is in a younger generation than said first node, wherein said method further includes youthening said migrant.

52. The computing system of claim 51, wherein youthening said migrant includes immigration-side youthening of said migrant.

53. The computing system of claim 51, wherein youthening said migrant includes emigration-side youthening of said migrant.

54. The computing system of claim 21, wherein said first node is a node in a multi-node system in which each node has a nodal generation-count, wherein said multi-node system includes at least a second node, wherein, upon recovery following a failure of said second node, said first node rolls back to a state that corresponds to a nodal-generation count of said second node.

55. The computing system of claim 21, wherein said first node is a node in a multi-node system in which each node has a nodal generation-count, wherein said multi-node system includes at least a second node, wherein, upon recovery following a failure of said first node, said first node rolls forward to a state that corresponds to a nodal-generation count of said second node by restoring committed work from a checkpoint and restoring uncommitted work from a journal.

56. The computing system of claim 21, wherein said first node is a node in a multi-node system in which each node has a nodal generation-count, said method including, at said first node,
receiving, from a master node, a message indicating that a checkpoint is to be carried out,
in response, youthening a nodal generation count of said first node,
suspending spawners from generating spawn,
saving spawner recovery information for recovering spawner states,
resuming said spawners,
determining that no further older-generation immigrants are expected at said first node, and
in response to said determination, committing, to said durable storage, said nodal recovery information.

57. The computing system of claim 56, the processor further configured to set a deadline, and, upon lapse of said deadline, suspend all older-generation spawn that are still executing while younger-generation spawn continue to execute, wherein said older-generation spawn and said younger-generation spawn are relative to a particular generation indicator.

58. The computing system of claim 21, wherein said first node is a node in a multi-node system, said method including saving a replica copy of working memory of said first node at said second node, upon failure of said first node, temporarily using said replica copy for processing that would otherwise have been carried out by said first node, and, upon recovery of said first node, communicating, to said first node, information required to update memory in said first node so that subsequent computation can be carried out by said first node.

* * * * *